No. 644,583. Patented Mar. 6, 1900.
J. H. DOYLE.
ARTIFICIAL DENTURE.
(Application filed Feb. 15, 1899.)

(No Model.)

Witnesses
F. H. Schott
Anton Hoetzner

Inventor
John H. Doyle
by Grant Burroughs
Attorney

THE NORRIS PETERS CO., PHOTO-LITHO., WASHINGTON, D. C.

UNITED STATES PATENT OFFICE.

JOHN H. DOYLE, OF ATLANTA, GEORGIA.

ARTIFICIAL DENTURE.

SPECIFICATION forming part of Letters Patent No. 644,583, dated March 6, 1900.

Application filed February 15, 1899. Serial No. 705,539. (No model.)

*To all whom it may concern:*

Be it known that I, JOHN H. DOYLE, a citizen of the United States, residing at Atlanta, in the county of Fulton and State of Georgia, have invented certain new and useful Improvements in Artificial Dentures, of which the following is a full, clear, and exact description, such as will enable those skilled in the art to which it appertains to make and use the same.

This invention relates to improvements in artificial dentures, and more particularly to the construction of artificial gums. It has for its object the production of a gum that has a natural appearance, that is easily and quickly made, that is of cheap construction, and that is efficient in its purpose.

It consists of the novel construction, combination, and arrangement of parts, such as will be hereinafter fully described, pointed out in the appended claims, and illustrated in the accompanying drawings.

Figure 1:
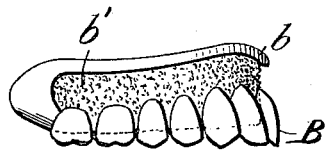
Figure 2:
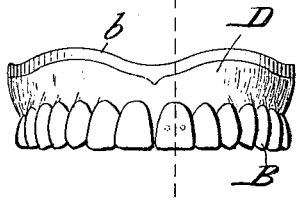
Figure 3:
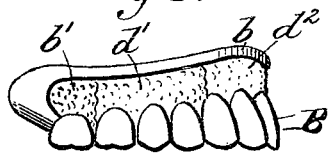
Figure 4:
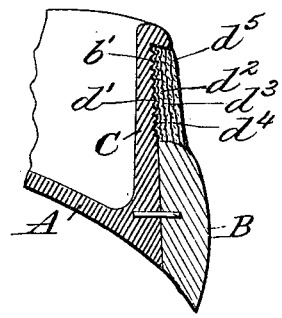
Figure 5:
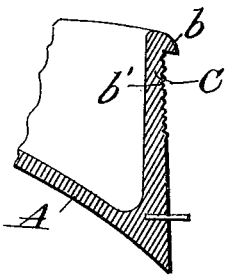
Figure 6:
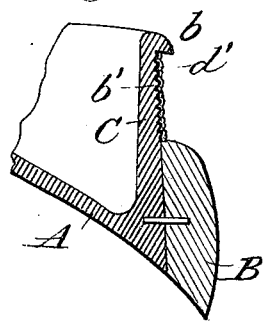
Figure 7:
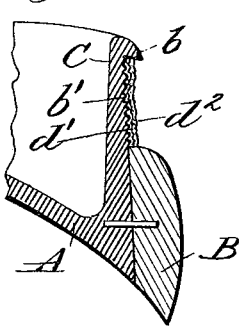

In the accompanying drawings, Figure 1 is a side elevation showing an upper base-plate and the teeth attached thereto. Fig. 2 is a front elevation showing an upper plate completed. Fig. 3 is a side elevation showing an upper plate with the teeth attached and the gum in several stages of completion. Fig. 4 is an enlarged sectional view on the line 4 4 of Fig. 2. Fig. 5 is an enlarged sectional view showing the front of an upper plate. Fig. 6 is a similar view showing a tooth and the gum partly formed. Fig. 7 is a similar view showing the gum in a more advanced stage of completion.

Similar reference characters designate corresponding parts in the several views.

Referring to the drawings, A designates the base-plate; B, the teeth attached to the base-plate; C, the gum-plate projecting from the base-plate, and D the gum covering the gum-plate and the upper ends of the teeth. The base-plate A and the teeth B attached thereto may be of any construction suitable in the premises. It is preferred, however, that the base-plate be made of any of the well-known compositions used for the purpose rather than of metal, as better results are obtained in their use.

The gum-plate C projects from the upper surface of the base-plate at the front edge of the latter. It has projecting from its upper edge the rib $b$. The angle formed by the latter and the front face of the gum-plate is slightly acute, so that the gum will be more firmly held in place. The front face $b'$ of the gum-plate is roughened or dentated between the upper ends of the teeth and the rib $b$. On this roughened or dentated face is placed the gum D. The latter consists of several layers $d'$ $d^5$ of composition successively formed upon the gum-plate and upon each other.

The gum is formed of any of the well-known pyroxylin compounds dissolved in a suitable solvent. The latter should be volatile, so as to evaporate on exposure. In making the gum the pyroxylin is dissolved to such an extent as to be quite plastic or semiliquid. By means of a suitable tool a layer of the compound, such as $d'$, is spread over the roughened or dentated surface $b'$. As the solvent evaporates and the composition hardens the latter is compressed upon the gum-plate. By reason of the roughened surface of the gum-plate and its natural adhesive qualities the compound adheres firmly to the gum-plate. After the first layer is applied a second layer, such as $d^2$, is applied to the first layer. The solvent in the new layer dissolves to a slight degree the outer face of the first layer with which it comes in contact, and a secure adhesion of the two layers is thereby secured. The second layer is compressed and shaped on the first layer. The succeeding layers, as $d^3$, $d^4$, and $d^5$, are applied in the same way. The number of layers of the composition may be varied as the occasion requires. As the layers are successively applied the unevenness in the first layer caused by the roughened gum-plate is smoothed over, so that when the last layer is applied a smooth surface to the gum is obtained. As each layer is applied it is shaped and molded to cover the roots of the teeth and to extend beneath the rib $b$ and also to assume the natural shape of the gum.

By applying the composition in layers rather than all at once in a single mass a hard, compact, and elastic gum is produced. If it should be applied all at once in a single mass, the gum so produced would be soft in its interior, as the solvent in the interior of the gum would not evaporate until after the outer surface had been hardened and compressed. Thus a gum would be produced with a hardened exterior and a soft and spongy interior. Such a gum would be liable to be checked and cracked and otherwise injured. By building up the gum in successive layers the solvent has a chance to evaporate, and the gum when completed will have the same density throughout.

Having thus described my invention, what I claim, and desire to secure by Letters Patent, is—

1. In an artificial denture, the combination of a gum-plate, and the gum consisting of a series of layers of composition affixed to each other and to the face of the gum-plate.

2. In an artificial denture, the combination of a gum-plate having its face roughened, or dentated, and the gum consisting of a series of layers of composition affixed to each other and to the roughened, or dentated, face of the gum-plate.

In testimony whereof I hereunto affix my signature in the presence of two witnesses.

JOHN H. DOYLE.

Witnesses:
GRANT BURROUGHS,
JOHN R. FARNUM.